3,658,877
PROCESS FOR PREVENTION OF CATALYST
HANG-UP IN AMMOXIDATION OF OLEFINS
TO UNSATURATED NITRILES
James L. Callahan and Robert D. Presson, Bedford Heights, and Arthur F. Miller, Cleveland, Ohio, assignors to The Standard Oil Company, Cleveland, Ohio
Continuation-in-part of application Ser. No. 849,554, July 22, 1969, which is a continuation of application Ser. No. 566,878, July 21, 1966. This application July 13, 1970, Ser. No. 54,445
Int. Cl. C07c *121/02, 121/32*
U.S. Cl. 260—465.3          1 Claim

ABSTRACT OF THE DISCLOSURE

Steam is used keep the quiescent zone about 200° F. cooler than the turbulent zone of a fluid-bed reactor utilized in the ammoxidation of monoolefins to unsaturated nitriles. Steam escaping from the quiescent zone into the turbulent zone prevents fusion of powdery catalyst in the presence of oxygen and the adhesion of fused catalyst to internals in the top portion of the reactor.

---

This is a continuation-in-part of our earlier filed application Ser. No. 849,554 filed July 22, 1969, which is a streamlined continuation of our application Ser. No. 566,878 filed July 21, 1966, both now abandoned.

This invention relates to the prevention of catalyst decomposition in the top portion of a fluidized solid catalytic reactor and more particularly pertains to an apparatus designed to substantially prevent decomposition and build-up of catalyst above the cyclone intake at the top of a fluidized solid catalyst reactor.

Fluidized solid catalyst reactors in which a gaseous reactant component contacts a fluidized solid catalyst and particularly in fluidized solid ammoxidation and oxidation reactors commonly employ one or more single or multi-stage cyclone separators to remove solid catalyst particles from the effluent gases near the top of the reactor. These cyclones, associated piping, duct work, and supporting members present a large amount of surface area upon which catalyst fines or dilute phase solid catalyst can accumulate. The flat, horizontal surfaces near the top of the reactor are particularly prone to accumulate substantial quantities of catalyst. The catalyst which accumulates on these surfaces and particularly the stagnant or immobilized catalyst tends to be chemically reduced by prolonged contact with the effluent gases and this has several undesirable consequences. The heat generated by the reduction of the catalyst and/or reoxidation of the reduced catalyst causes the catalyst to be damaged by loss of surface area which is an important physical characteristic of the catalyst and to suffer damage in other ways. In some cases, the fine catalyst particles which accumulate at the top of the reactor become fused and agglomerated into much larger particles and even into large chunks. When the catalyst becomes fused, it often becomes sticky causing more dilute phase catalyst in its vicinity to stick to the sticky, fused surface and ultimately to suffer the same fate. As this process continues, the entire cyclone region in the top or head of the reactor may become packed with reduced and fused catalyst. Mechanical vibration at times causes large and small pieces of the fused catalyst in the reactor head to break loose and fall into the dense phase catalyst bed of the reactor proper. The presence of these large pieces of catalyst in the reactor frequently disrupt the normal patterns of gas flow and catalyst circulation causing inefficiency in conversion and, in extreme cases, causing damage to the remainder of the catalyst.

The present invention eliminates the problems discussed above.

The accompanying drawing shows as an illustration of the present invention the upper section of a vertical, substantially cylindrical fluidized bed catalyst reactor constructed of steel or other appropriate metal equipped with a three-stage cyclone, each stage having a dip leg and an effluent line leading out of the reactor from the third stage of the cyclone. The reactor shell is equipped with an opening and duct for an inert purge gas and a horizontal plane with open area is provided just above the cyclone horn of the first stage. The open area in the horizontal plane can be at any location but is preferably somewhat removed from the cyclone area.

The present process involves the positioning of a horizontal plate of planar configuration at an elevation within the reactor at or near the top of the primary or first stage cyclone horn or horns. This horizontal plane extends over essentially the entire open cross-sectional area of the reactor and is fitted snugly around dip legs, cyclone bodies and other internals.

Another aspect of this invention involves providing a small percentage of open area in the horizontal plane preferably removed from any of the cyclones, associated piping, duct work and supporting members. The exact position of this open area in the horizontal plane is not critical just so long as the enclosed gas volume in the head of the reactor is in free communication with the main reactor gas stream.

In addition, an inert purge gas is bled continuously into the region above the horizontal plane at such a rate that the average lineal velocity of the purge gas passing out through the open area in the horizontal plane into the reactor proper is in the range of 0.1 to 10 ft./sec. The open area in the horizontal plane comprises between about 0.1 to 10 percent of the total cross-sertional area of the reactor. In any case, it must be at least large enough to permit the pressure between the main reactor volume and the volume above the horizontal plane to equalize a change in pressure of the main reactor volume without developing a pressure differential during the equalization process of greater than about 5 p.s.i.g.

It has been discovered that practice of the present invention prevents the usual deposition, stagnation, reduction and fusion of catalyst in the region of the reactor above the primary cyclone horns. Costly damage to the catalyst and ultimate shut-down of the reactor due to disruptive fused catalyst lumps in the dense phase fluidized catalyst bed is thus eliminated.

While the subject invention may be applied advantageously to all fluidized catalyst hydrocarbon oxidation reactors with internal cyclones near the top, it is particularly advantageously applied to such reactors employed in the oxidation of olefin-ammonia mixtures to unsaturated nitriles (such as propylene-ammonia to acrylonitrile or isobutylene-ammonia to methacrylonitrile), the oxidation of olefins to aldehydes and acids (such as propylene to acrolein and acrylic acid or isobutylene to methacrolein and methacrylic acid), and the oxidative dehydrogenation of olefinc to diolefins (such as butene-1 to butadiene). Especially outstanding advantages are experienced when the invention is practiced with catalysts comprising the element antimony (such as antimony oxide in combination with one or more elements from the group uranium, iron, manganese, tin, bismuth, cerium, thorium, molybdenum, tungsten, vanadium, tellurium, selenium, etc.) and particularly the catalysts disclosed in U.S. Pats. Nos. 3,200,084; 3,200,081; 3,198,750; 3,197,419 and 3,244,642.

In one preferred embodiment, the invention is practiced as follows:

(1) A horizontal plane of 1/8" or 1/2" carbon steel plate is fitted over the open cross section of the reactor at the elevation of the top of the primary cyclone horns. It is fitted around dip legs, cyclone bodies and other internals such that sufficient gas is provided between the plane and the internal member in question to allow for thermal expansion and contraction.

(2) Additional holes are provided in the horizontal plane to bring the total open area (sum of gaps around members and additional holes) within the range of 0.5 to 5 percent of the reactor cross section.

(3) Provision is made to feed inert gas from an inert gas generator into the head of the reactor above the horizontal plane at such a rate that the average linear gas velocity of the inert gas passing through the open areas in the horizontal plane is within the range of 0.3 to 1.0 ft./sec. (calculated at the temperature and pressure of the reactor).

EXAMPLE (A) In a control reaction which is outside the scope of the present invention, acrylonitrile was prepared from a mixture of propylene, air and ammonia in the presence of an antimony oxide-uranium oxide catalyst. The reactor was a cylindrical tube constructed of steel having a diameter of 11 feet and a height of about 50 feet. The catalyst bed depth was 22 feet under static conditions and the catalyst was a fluidized solid combined antimony oxide-uranium oxide catalyst on a silica carrier more fully described in U.S. Pat. No. 3,198,750. The reactor contained perforated horizontal plates or sieve-trays spaced at two foot intervals and each of the sieve-trays had about 30 percent open area with 5/8" diameter holes as more fully described in U.S. Pat. No. 3,230,246. The feed consisted of propylene:air-ammonia in the mole ratio of 1:10.5–11.5:1.15, respectively. The reaction temperature was 920–940° F. and an initial pressure of about 16–18 p.s.i.g. was reached in the upper portion of the reactor. The top of the reactor was equipped with a multiple cyclone arrangement as shown in the drawing minus the horizontal plate. A feed rate of 1.5 feet per second was the superficial linear velocity. The superficial linear gas velocity is defined as $$\frac{\text{Volume of feed in cubic feet per second}}{\text{Reactor cross-sectional area in square feet}}$$

and is expressed as feet per second.

The reaction was started up and a total conversion of 90–95 percent of propylene was achieved. An initial per pass conversion of propylene to acrylonitrile of 66–68 percent was obtained. The reaction was carried out continuously for about three months. Initially a normal catalyst loss of about 100 pounds per day was observed in the effluent and this was continually replaced. By the end of the three months operation period, however, apparent catalyst losses were from 200–500 pounds per day with no more than 100 pounds per day showing up in the effluent. The per pass conversion of propylene to acrylonitrile had also dropped to the range of 60–63 percent by this time and temperatures in excess of 1000° F. had developed in the top of the reactor. The operation was shut down and it was found that the region in the vicinity of the cyclones and particularly on the horizontal surfaces was completely filled with fused, reduced catalyst and that several tons of fused, reduced catalyst, which was damaged beyond use, were deposited in the cyclone region.

(B) The process of the present invention is illustrated with a repeat of (A) with the exception that the horizontal plate and inert gas inlets shown in the drawing were used with nitrogen as the inert gas at a linear gas velocity of about 0.5 ft./sec. In this experiment no more than the normal 100 pounds per day of catalyst were lost in the effluent, a normal 66–68 percent per pass conversion of propylene to acrylonitrile was achieved, no great temperature increase occurred in the top of the reactor, and no buildup of fused, reduced catalyst in the cyclone region of the reactor was observed after more than three months of continuous operation.

We claim:

1. A process for the fluid-bed ammoxidation of propylene or isobutylene to form acrylonitrile or methacrylonitrile, respectively, in the presence of excess oxygen wherein said propylene or isobutylene is converted to acrylonitrile or methacrylonitrile, without coke formation, in a reactor having a relatively quiescent zone above a turbulent reaction zone of a powdery catalyst, the improvement comprising introducing inert gas into said quiescent zone in an amount sufficient to provide an escape velocity of from 0.1 to 10 feet per second into said turbulent zone, simultaneously maintaining the temperature of said quiescent zone at least 200° F. below the mean temperature of said turbulent zone whereby clumping of said catalyst due to fusion, and adhesion of fused catalyst to internals in the top portion of the reactor, is substantially prevented.

References Cited

UNITED STATES PATENTS

| 2,706,704 | 4/1955 | Squires, Jr. | 23—288 |
| 3,472,892 | 10/1969 | Callahan et al. | 260—465.3 |
| 3,501,517 | 3/1970 | Hughes et al. | 260—465.3 X |
| 3,546,268 | 12/1970 | Ikeda et al. | 260—465.3 |

JOSEPH P. BRUST, Primary Examiner

U.S. Cl. X.R.

260—533, 604, 680